United States Patent Office 3,283,812
Patented Nov. 8, 1966

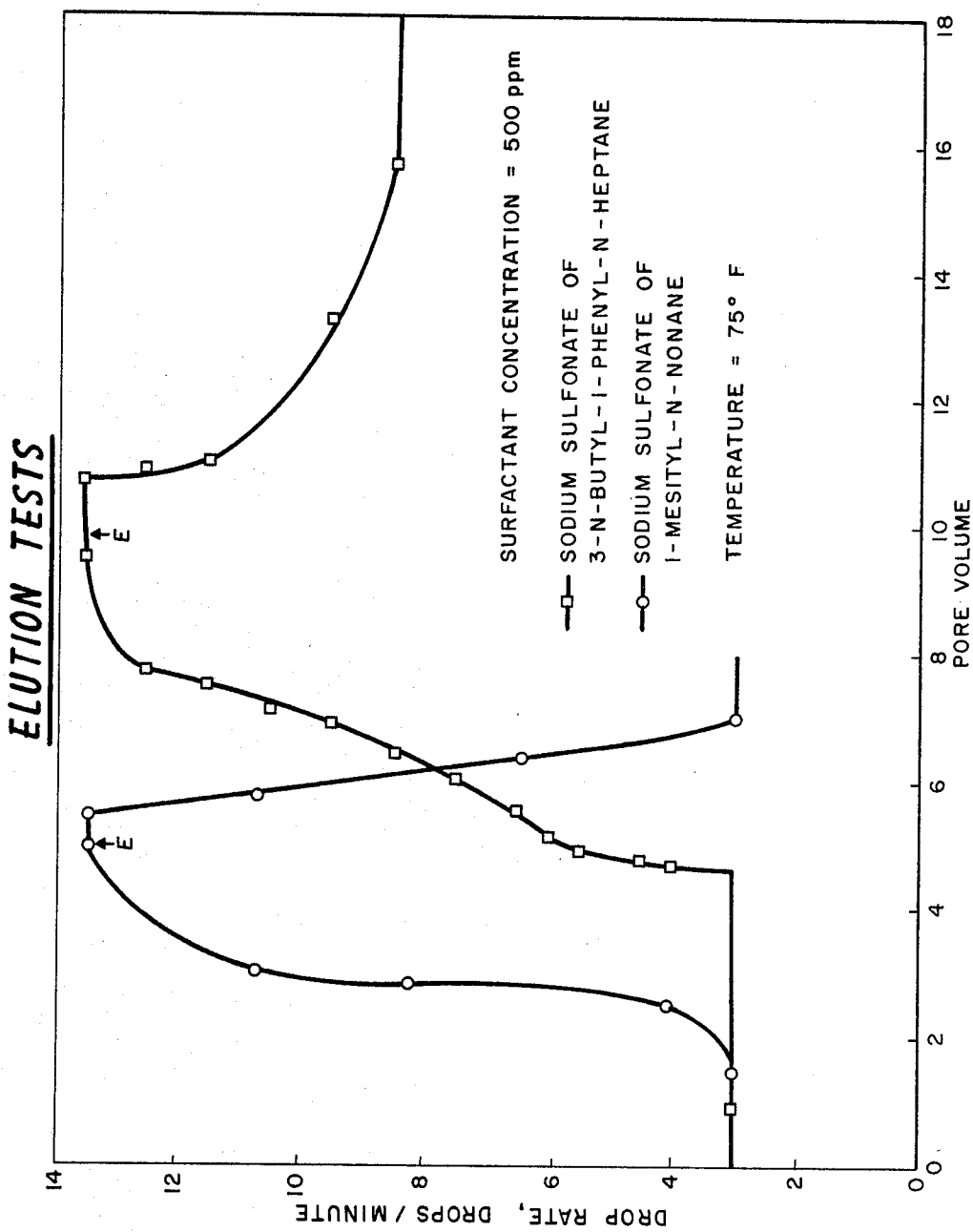

3,283,812
SURFACTANT FOR PETROLEUM RECOVERY
George P. Ahearn, Tulsa, Okla., and Albin F. Turbak, New Providence, N.J., assignors, by mesne assignments, to Esso Production Research Company, a corporation of Delaware
Filed May 20, 1963, Ser. No. 281,556
11 Claims. (Cl. 166—9)

The present invention relates to the recovery of oil from porous subsurface reservoirs. More particularly the invention relates to a method for increasing the recovery of oil from such reservoirs by the injection of floodwater containing an additive selected from an improved class of surface active compounds.

The petroleum industry has recognized for many years that only a small fraction of the original oil-in-place in a reservoir is expelled by natural mechanisms. It is also well known that conventional methods of supplementing natural recovery are relatively inefficient. Typically, a reservoir retains about half of its original oil supply even after the application of available methods for secondary recovery. Accordingly, there is a continuing need for improved artificial recovery methods which will substantially increase the ultimate yield of petroleum from natural reservoirs.

Waterflooding is by far the most economical and widely practiced method of supplementing natural petroleum recovery. Various floodwater additives have been proposed in an effort to increase the efficiency of a waterflood. For example water thickeners have been developed for the purpose of adjusting floodwater viscosity in order to minimize the tendency of floodwater to finger ahead of the flood front. Corrosion inhibitors and bactericides have been added in order to minimize water contamination from corrosion and bacteria growth. A great many surface active agents have been proposed for addition to floodwater for the purpose of lowering interfacial tension between the water and the reservoir oil, thereby increasing the ultimate recovery of oil displaced by the waterflood. Typical surfactants which have been proposed for this purpose are alkyl pyridinium salts, sodium lauryl sulfate, glycosides, sodium oleate, quaternary ammonium salts and the like.

Although the addition of surface active agents to floodwater may increase oil recovery, such methods are usually prohibitively expensive because of the tendency of most surfactants to be adsorbed on the surfaces of the rock in the formation being flooded. The result of this phenomenon is a depletion of the surface active material in the advancing waterfront before any significant benefit can be realized. Thus in many cases, the amount of surface active agent that would be required to provide effective penetration of the reservoir would entail a cost greatly out of proportion to the benefits derived.

It is a general object of the present invention to improve the performance of waterflooding methods for recovering oil from underground reservoirs. It is a more specific object of the invention to overcome the disadvantages heretofore encountered in the use of surface active agents in waterflooding operations. It is a further object of the invention to provide for use in waterflooding operations surfactants which are characterized by a minimum degree of adsorption on the formation rock surfaces.

The invention is based on a discovery that surface active agents having a sterically hindered molecular configuration have a greatly reduced tendency to be adsorbed on rock surfaces. Specifically, we have found that if the polar or functional group of a surfactant molecule is sterically hindered by one or more α-substituents, the adsorption of the surfactant is minimized. Any stable, non-adsorbing substituent located in a position alpha with respect to the polar or functional group is within the scope of the invention. Stated otherwise, such substituent must be relatively non-polar with respect to the hydrophilic or functional group of the surfactant, inasmuch as the degree of polarity of a substituent or group is generally directly related to its propensity to adsorb. Accordingly, the preferred hindering substituents are hydrocarbyl radicals and halogen atoms. Suitable hydrocarbyl groups contain from 1 to 20 carbon atoms, and include the branched and straight-chain alkyl groups, aryl, alkaryl and aralkyl groups. Although the principle is applicable to any surfactant molecule wherein a polar or functional group is attached to one or more carbon chains or rings, the following structures are illustrative:

(1) 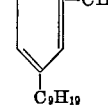

Sodium sulfonate of 1-tolyl-n-nonane (2) 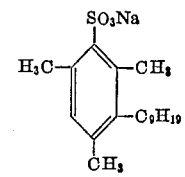

Sodium sulfonate of 1-mesityl-n-nonane (3) 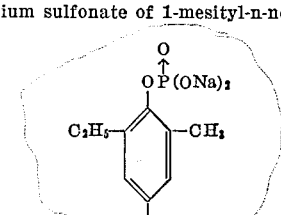

Disodium 2-methyl-4-decyl-6-ethyl phenyl phosphate (4) 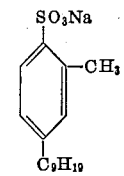

Perfluoro-α,α-dimethyl caprylic acid (5) 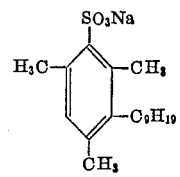

Polyoxypropylated lauric acid (6) 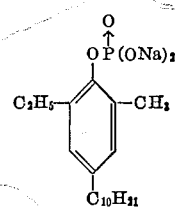

Polyoxypropylated nonylphenol (7) 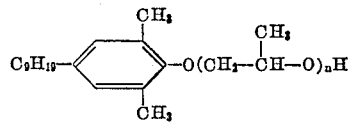

Polyoxypropylated 2,6-dimethyl-4-nonylphenol (8) 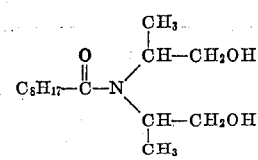

N,N-di(2-methylethanol)pelargonamide (9) 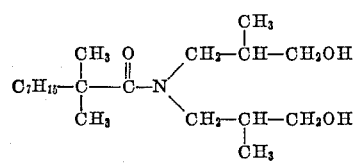

N,N-diisobutanol neohendecamide

In each of the above examples, the molecule is composed of a hydrophilic portion and hydrophobic portion. The polar or functional group of each example imparts a hydraphilic character to that portion of the molecule, whereas the remaining, relatively non-polar portions is hydrophobic.

Examples 1 and 2 above represent the entire class of alkyl aromatic sulfonates, modified in accordance with the present invention, by the presence of a non-polar substituent in one or both positions ortho to the sulfonate group. Although methyl groups are shown by way of example, other hydrocarbyl groups containing up to 20 carbon atoms are also contemplated, as are the halogen atoms. Moreover, the nonyl group shown is illustrative of alkyl groups having 7 to 20 carbon atoms, as commonly known to be characteristic of this class of surfactants.

Example 3 represents the class of alkyl aromatic-substituted phosphoric acids, modified in accordance with the invention, by the presence of a sterically hindering, non-adsorbing substituent in one or both positions ortho to the phosphoric acid group. As indicated earlier, the hindering substituent may be a halogen atom, including chlorine, bromine and iodine, or other hydrocarbyl groups, including aryl, alkaryl and aralkyl groups. The decyl group is represented of alkyl groups having 7-20 carbon atoms.

Example 4 represents the perfluorinated neo-acids having 7-20 carbon atoms per molecule.

Example 5 represents the condensation products of propylene oxide or butylene oxide reacted with a fatty acid. The methyl groups on the polymeric chain sterically hinder the ether sites in accordance with the concept of the present invention.

Examples 6 and 7 are illustrative of the condensates of alkyl phenols with propylene oxide or butylene oxide. As in Example 5, the methyl groups of the polymeric chain act to hinder the ether sites. Moreover, in Example 7 the oxygen adjacent the carbon ring is further hindered by the presence of non-polar substituents in the ortho positions relative to the polyalkoxy chain.

Examples 8 and 9 are representative of the condensates of fatty acids with branched alkanolamines. The branching in the carbon chain of the alkanolamine acts to hinder the amide nitrogen as well as the hydroxy groups. In Example 9 the fatty acid is a neo-acid, i.e., an aliphatic acid having gem disubstitution on the alpha carbon atom. Again, the substituents shown are methyl groups, but are only illustrative of the same class of hindering substituents defined earlier.

Suitable surfactant concentrations in the floodwater of a displacement operation range from 0.01% by weight, up to 5% or more, depending upon the particular species of surfactant being used. The upper limit of this range is usually fixed by the solubility of the surfactant in the field brine, and by the fact that the use of larger amounts becomes increasingly uneconomical. The addition of surfactant to the injected floodwater may be continuous or intermittent, without departing from the scope of the invention.

Comparative tests were conducted to demonstrate the sharply reduced adsorption attributable to the introduction of methyl groups in the alpha positions adjacent the sulfonic acid group of an alkyl aromatic sulfonate surfactant. The adsorption of the p-sodium sulfonate of 3-n-butyl-1-phenyl-n-heptane was compared with the adsorption of the sodium sulfonate of 1-mesityl-n-nonane by separate elution tests in which an aqueous solution of each of these materials was passed at room temperature through a torpedo sandstone core having a permeability of about 500 millidarcies. The core was 11 inches long and ½ inch in diameter. The results are plotted in the accompanying drawing.

The elution tests were conducted at a constant flow rate. The effluent was released from a capillary immersed in an oil bath, whereby increases in the drop-rate correspond to the appearance of surfactant in the effluent, and a decreased drop-rate corresponds to its disappearance. The early breakthrough of the sterically hindered compound, 1-mesityl-n-nonane, is clearly indicative of the merit of the present invention.

When a maximum drop-rate was attained in each test, as indicated by the arrow "E," the injection of surfactant solution was discontinued, and the injection of NaCl brine was commenced, at the same constant flow rate as before. Only two pore volumes of brine was required to completely remove the mesityl nonane from the core, whereas a large portion of the unhindered compound remained in the core after the injection of eight pore volumes of brine. It is apparent that a very substantially reduced adsorption has occurred in the test of the sterically hindered surfactant, compared with the other sulfonate.

As a specific embodiment of the invention, waterflood residual oil was displaced from a torpedo sandstone core in accordance with the following procedure. A 15.08 cm. water-wet core having a diameter of about 2.6 cm. was saturated with oil and then was waterflooded with a 2% NaCl brine to a residual crude oil saturation. Then, a 0.1% solution of the sodium sulfonate of 1-mesityl-n-nonane in 2% NaCl brine was passed through the core under a pressure gradient of 1.0 p.s.i./ft. After the injection of only 1.75 pore volumes of surfactant solution, the effluent liquids were found to exhibit an interfacial tension equal to that of the injected solution, indicating a substantial "breakthrough" of surfactant solution, without excessive adsorption in the core.

What is claimed is:

1. A method for the recovery of oil from a subterranean reservoir penetrated by an injection well and a production well laterally spaced therefrom, which comprises introducing water and a surfactant into said reservoir through said injection well and producing displaced reservoir oil from said production well, wherein said surfactant comprises a compound having a polar functional group attached to an aryl radical having a non-polar substituent in a position ortho to said functional group.

2. A method as defined by claim 1 wherein said surfactant comprises a product obtained by reacting propylene oxide with a substituted phenol having a non-polar substituent in a position ortho to the hydroxy group.

3. A method as defined by claim 1 wherein said surfactant comprises a product obtained by reacting butylene oxide with a substituted phenol having a non-polar substituent in a position ortho to the hydroxy groups.

4. A method as defined by claim 1 wherein said surfactant comprises an ortho-substituted alkyl aromatic sulfonate.

5. A method as defined by claim 4 wherein said aromatic sulfonate comprises a sulfonate of 1-mesityl n-nonane.

6. A method as defined by claim 4 wherein said aromatic sulfonate comprises a sulfonate of 1-tolyl n-nonane.

7. A method as defined by claim 1 wherein said surfactant comprises an alkyl aromatic-substituted phosphoric acid, and wherein a non-absorbing constituent is located in a position ortho to the phosphoric acid group.

8. A method for the recovery of oil from a subterranean reservoir penetrated by an injection well and a production well laterally spaced therefrom, which comprises introducing water and a surfactant into said reservoir through said injection well and producing displaced reservoir oil from said production well, wherein said surfactant comprises a condensation product obtained by reacting a fatty neo-acid with an alkylene oxide.

9. A method for the recovery of oil from a subterranean reservoir penetrated by an injection well and a production well laterally spaced therefrom, which comprises introducing water and a surfactant into said reservoir through said injection well and producing displaced reservoir oil from said production well, wherein said surfactant comprises a condensation production obtained by reacting a fatty acid with a branched chain alkanol amine.

10. A method for the recovery of oil from a subterranean reservoir penetrated by an injection well and a production well laterally spaced therefrom, which comprises introducing water and a surfactant into said reservoir through said injection well and producing displaced reservoir oil from said production well, wherein said surfactant comprises a condensation product obtained by reacting a fatty neo-acid with an alkanol amine.

11. A method for the recovery of oil from a subterranean reservoir penetrated by an injection well and a production well laterally spaced therefrom, which comprises introducing water and a surfactant into said reservoir through said injection well and producing displaced reservoir oil from said production well, wherein said surfactant comprises a perfluorinated neo-acid having 7–20 carbon atoms per molecule.

References Cited by the Examiner
UNITED STATES PATENTS

| | | |
|---|---|---|
| 2,233,382 | 2/1941 | De Groote et al. |
| 2,875,831 | 3/1959 | Martin et al. _____ 166—9 |

CHARLES E. O'CONNELL, *Primary Examiner.*

T. A. ZALENSKI, *Assistant Examiner.*